US011378083B2

(12) United States Patent
Solberg et al.

(10) Patent No.: US 11,378,083 B2
(45) Date of Patent: Jul. 5, 2022

(54) MECHANICAL BARRIER FLUID PRESSURE REGULATION FOR SUBSEA SYSTEMS

(71) Applicant: OneSubsea IP UK Limited, London (GB)

(72) Inventors: Petter Solberg, Bergen (NO); Hans Fredrik Kjellnes, Nesttun (NO); Audun Magne Askeland, Bergen (NO)

(73) Assignee: OneSubsea IP UK Limited, Londong (GB)

( * ) Notice: Subject to any disclaimer, the term of this patent is extended or adjusted under 35 U.S.C. 154(b) by 387 days.

(21) Appl. No.: 15/867,037

(22) Filed: Jan. 10, 2018

(65) Prior Publication Data
US 2018/0209425 A1 Jul. 26, 2018

Related U.S. Application Data

(60) Provisional application No. 62/449,736, filed on Jan. 24, 2017.

(51) Int. Cl.
F04D 13/08 (2006.01)
F04D 29/10 (2006.01)
(Continued)

(52) U.S. Cl.
CPC ........ F04D 13/086 (2013.01); E21B 33/0355 (2013.01); E21B 43/0107 (2013.01);
(Continued)

(58) Field of Classification Search
CPC .......... F16K 17/00; F16K 17/02; F16K 17/04; F16K 17/0466; F16K 17/0486;
(Continued)

(56) References Cited

U.S. PATENT DOCUMENTS 3,955,597 A * 5/1976 Oneyama ............... F16K 11/161
137/625.48
3,999,766 A 12/1976 Barton
(Continued)

FOREIGN PATENT DOCUMENTS

GB 2166567 A 5/1986
WO 2011048213 A2 4/2011
(Continued)

OTHER PUBLICATIONS

Extended European Search Report issued in European Patent Appl. No. 18153016.3 dated Jun. 25, 2018; 9 pages.

Primary Examiner — Charles G Freay
Assistant Examiner — Chirag Jariwala
(74) Attorney, Agent, or Firm — Eileen Pape

(57) ABSTRACT

A technique facilitates controlling barrier fluid via a mechanical pressure regulation system which may be coupled with a rotating machine at a subsea location. The mechanical pressure regulation system enables controlled supply of the barrier fluid to the rotating machine and comprises a mechanical valve mechanism. The mechanical valve mechanism automatically maintains a pressure differential between the barrier fluid and a process fluid within a desired range. According to an embodiment, the mechanical valve mechanism is mechanically actuated via pressures applied to a pilot piston so as to provide barrier fluid to the rotating machine when the pressure differential reaches a lower limit and to dump barrier fluid when the pressure differential reaches an upper limit.

11 Claims, 11 Drawing Sheets

(51) Int. Cl.
*F04D 29/06* (2006.01)
*F04D 25/06* (2006.01)
*F04D 13/10* (2006.01)
*E21B 33/035* (2006.01)
*E21B 43/01* (2006.01)
*E21B 43/12* (2006.01)
*F04B 47/06* (2006.01)
*F16K 17/04* (2006.01)

(52) U.S. Cl.
CPC .............. *E21B 43/12* (2013.01); *F04B 47/06* (2013.01); *F04D 13/10* (2013.01); *F04D 25/0686* (2013.01); *F04D 29/061* (2013.01); *F04D 29/104* (2013.01); *F04D 29/108* (2013.01); *F16K 17/04* (2013.01)

(58) Field of Classification Search
CPC ...... F16K 17/06; F16K 17/065; F16K 17/082; F04D 13/00; F04D 13/02; F04D 13/06; F04D 13/08; F04D 13/086; F04D 13/10; F04D 15/00; F04D 15/0005; F04D 15/0011; F04D 15/0016; F04D 15/0077; F04D 15/02; F04D 15/0281; F04D 25/00; F04D 25/02; F04D 25/06; F04D 25/0686; F04D 29/06; F04D 29/061; F04D 29/063; F04D 29/66; F04D 29/661; F04D 29/669; F04D 29/104; F04D 29/108; E21B 43/00; E21B 43/0107; E21B 43/01; E21B 43/12; E21B 43/121; E21B 43/128; E21B 33/076; E21B 33/0355
See application file for complete search history.

(56) References Cited

U.S. PATENT DOCUMENTS

| | | | | |
|---|---|---|---|---|
| 4,522,037 | A | 6/1985 | Ares et al. | |
| 4,696,163 | A * | 9/1987 | Glomeau | F15B 13/01 60/390 |
| 9,030,654 | B2 † | 5/2015 | Nishida | |
| 2006/0204375 | A1* | 9/2006 | Judge | F04B 9/1235 417/393 |
| 2008/0260539 | A1* | 10/2008 | Stinessen | F04D 25/0686 417/34 |
| 2010/0150740 | A1* | 6/2010 | Veland | F04B 53/164 417/53 |
| 2012/0160327 | A1* | 6/2012 | Tomter | F04C 15/0034 137/1 |
| 2012/0186659 | A1* | 7/2012 | Lumkes | F04B 7/02 137/485 |
| 2014/0241907 | A1* | 8/2014 | Grynning | E21B 43/128 417/252 |
| 2015/0068606 | A1* | 3/2015 | Ottestad | E21B 41/0007 137/565.13 |
| 2015/0316162 | A1* | 11/2015 | Ottestad | F04D 25/0686 137/488 |
| 2018/0058597 | A1* | 3/2018 | Kanstad | F16K 17/0493 |
| 2018/0231005 | A1* | 8/2018 | Elvebakken | F04D 13/062 |

FOREIGN PATENT DOCUMENTS

| | | |
|---|---|---|
| WO | 2011161516 A1 | 12/2011 |
| WO | 2014092581 A1 | 6/2014 |

* cited by examiner
† cited by third party

MECHANICAL BARRIER FLUID PRESSURE REGULATION FOR SUBSEA SYSTEMS

CROSS-REFERENCE TO RELATED APPLICATION

The present document is based on and claims priority to U.S. Provisional Application Ser. No. 62/449,736, filed Jan. 24, 2017, which is incorporated herein by reference in its entirety.

BACKGROUND

A subsea pump or compressor is supplied with clean fluid for cooling and lubrication of, for example, a motor, bearings, and mechanical seals. The clean fluid may be supplied from a topside reservoir or other topside source through an umbilical. The clean fluid used for lubrication and cooling is referred to as a barrier fluid and may be circulated through the desired components via a system impeller. To prevent an ingress of dirty process fluid into the pump/compressor and motor internals, the barrier fluid pressure inside the subsea system is maintained at a higher pressure than the relevant process fluid pressure, e.g. the process fluid pressure at the suction or discharge end of the subsea pump. Consequently, leakage of barrier fluid moves from the pump internals to the process side. This leakage can happen across a set of dynamic seals, e.g. mechanical seals, positioned at the suction and discharge sides of the pump.

To provide safe operation and to stay within the limits of the mechanical seal integrity, the pressure differential (dP) from the barrier fluid side to the process side is maintained within a certain threshold. For example, the threshold may range from 20 to 80 bars when the pump is in operation. Leakage across the mechanical seals bleeds down barrier fluid pressure in the subsea motor/pump so the barrier fluid is typically refilled from the topside. Dynamic process conditions and temperature variations of the barrier fluid also may necessitate rapidly filling or dumping of barrier fluid to the process side to stay within the desired pressure differential. Conventionally, this control is provided by a topside control system based on differential pressure measurements combined with electrically actuated and piloted valves located subsea. Such systems can be vulnerable to fast transient conditions and their function becomes limited in power blackout situations.

SUMMARY

In general, the present disclosure provides a system and methodology for controlling barrier fluid via a mechanical pressure regulation system which may be coupled with a rotating machine at a subsea location. The mechanical pressure regulation system enables controlled supply of the barrier fluid to the rotating machine and comprises a mechanical valve mechanism. The mechanical valve mechanism automatically maintains a pressure differential between the barrier fluid and a process fluid within a desired range. According to an embodiment, the mechanical valve mechanism is mechanically actuated via pressures applied to a pilot piston so as to provide barrier fluid to the rotating machine when the pressure differential reaches a lower limit and to dump barrier fluid when the pressure differential reaches an upper limit.

BRIEF DESCRIPTION OF THE DRAWINGS

Certain embodiments will hereafter be described with reference to the accompanying drawings, wherein like reference numerals denote like elements. It should be understood, however, that the accompanying figures illustrate various implementations described herein and are not meant to limit the scope of various technologies described herein, and.

DETAILED DESCRIPTION

In the following description, numerous details are set forth to provide an understanding of some illustrative embodiments of the present disclosure. However, it will be understood by those of ordinary skill in the art that the system and/or methodology may be practiced without these details and that numerous variations or modifications from the described embodiments may be possible.

The disclosure herein generally relates to a system and methodology for controlling barrier fluid via a mechanical pressure regulation system which may be coupled with a rotatable machine at a subsea location. By way of example, the rotatable machine may comprise a subsea pump or compressor powered by a subsea motor. Operation of the rotatable machine causes movement, e.g. pumping, of process fluid such as oil or gas.

The mechanical pressure regulation system enables controlled supply of a barrier fluid to the rotating machine to prevent ingress of process fluid into the pump/compressor and motor internals. The barrier fluid pressure inside the subsea rotating machine may be maintained at a higher pressure than the relevant process fluid pressure, e.g. the process fluid pressure at the suction or discharge end of a subsea pump. The barrier fluid may be supplied under pressure to a variety of components of the rotating machine, e.g. a motor, bearings, and mechanical seals, for preventing ingress of process fluid, for lubrication, and/or for cooling.

According to an embodiment, the mechanical pressure regulation system comprises a mechanical valve mechanism. The mechanical valve mechanism automatically maintains a pressure differential between the barrier fluid and the process fluid within a desired range. According to an embodiment, the mechanical valve mechanism is mechanically actuated via pressures applied to a pilot piston so as to provide barrier fluid to the rotating machine when the pressure differential reaches a lower limit and to dump barrier fluid when the pressure differential reaches an upper limit.

Effectively, the mechanical pressure regulation system provides a mechanical system which is independent of topside control. According to embodiments, the mechanical pressure regulation system is precise, fast acting, and robust while maintaining the ability to actuate independently of electrical power, signals, or input data. The automatic mechanical system can be used to limit the protection measures otherwise utilized for a subsea pump barrier fluid system. As a result, the mechanical pressure regulation system described herein enables substantial system simplifications and cost reductions. According to some embodiments, the mechanical pressure regulation system enables use of all-electric process valve actuation on subsea pumping systems as demands for fast actuation response of pump isolation valves disappear. Additionally, the mechanical pressure regulation system described herein facilitates movement of barrier fluid reservoirs to subsea locations.

Figure 1:
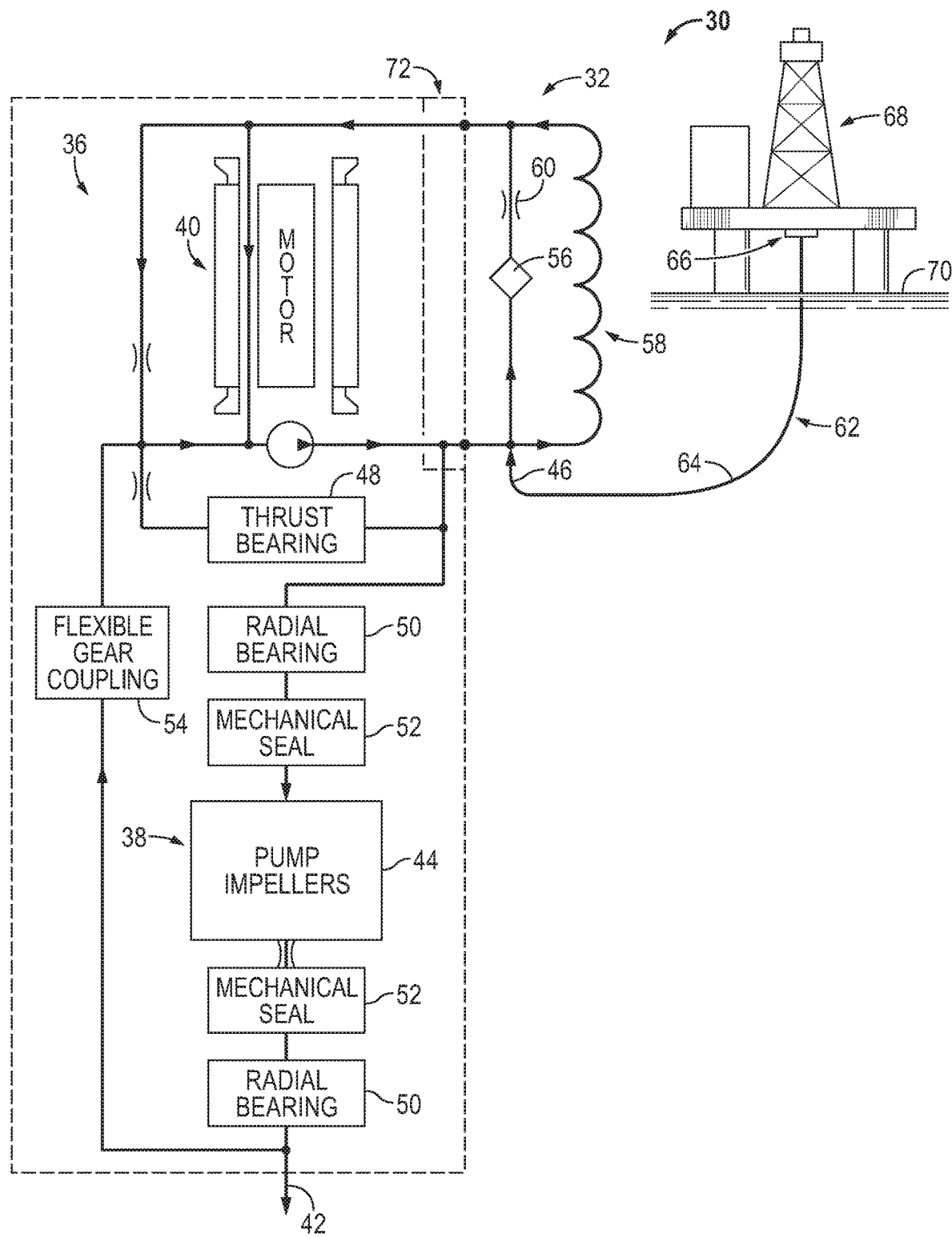
FIG. 1 is a schematic illustration of an example of a subsea barrier fluid system for a subsea rotating machine, e.g. a pump system, according to an embodiment of the disclosure.

Referring generally to FIG. 1, an embodiment of a subsea system 30 is illustrated as utilizing a mechanical pressure regulation system 32. The mechanical pressure regulation system 32 is coupled with a subsea rotatable machine 36, such as a subsea pump or compressor 38 powered by a subsea motor 40 to move, e.g. pump, a process fluid 42, such as oil or gas. In some embodiments, the pump or compressor 38 may comprise impellers 44 which are rotated to pump the process fluid 42.

The mechanical pressure regulation system 32 also ensures delivery of a barrier fluid 46, e.g. a suitable barrier oil, to components of the subsea rotatable machine 36, such as subsea motor 40, a thrust bearing 48, radial bearings 50, mechanical seals 52, a flexible gear coupling 54, and/or other components of subsea rotatable machine 36. The mechanical seals 52 are positioned to maintain separation between the barrier fluid 46 and the process fluid 42 which is pumped by impellers 44. In some embodiments, the barrier fluid 46 may be delivered through a suitable filter system 56, cooling system 58, and/or flow restriction system 60. The barrier fluid 46 is delivered at sufficient pressure to prevent ingress of process fluid 42 to internal components, such as components 40, 48, 50, 52, 54. The barrier fluid 46 also may be used to provide lubrication and/or cooling to such components.

In the embodiment illustrated, the barrier fluid 46 is provided by a barrier fluid supply 62 which may comprise, for example, an umbilical 64 coupled with a topside supply 66. By way of example, the topside supply 66 may be located on a surface facility 68, e.g. a surface platform or surface vessel, located along a sea surface 70. As described in greater detail below, the mechanical pressure regulation system 32 comprises a mechanical valve mechanism 72, e.g. a pressure balanced supply valve, which controls the pressure and supply of barrier fluid 46 to subsea rotatable machine 36.

Figure 2:
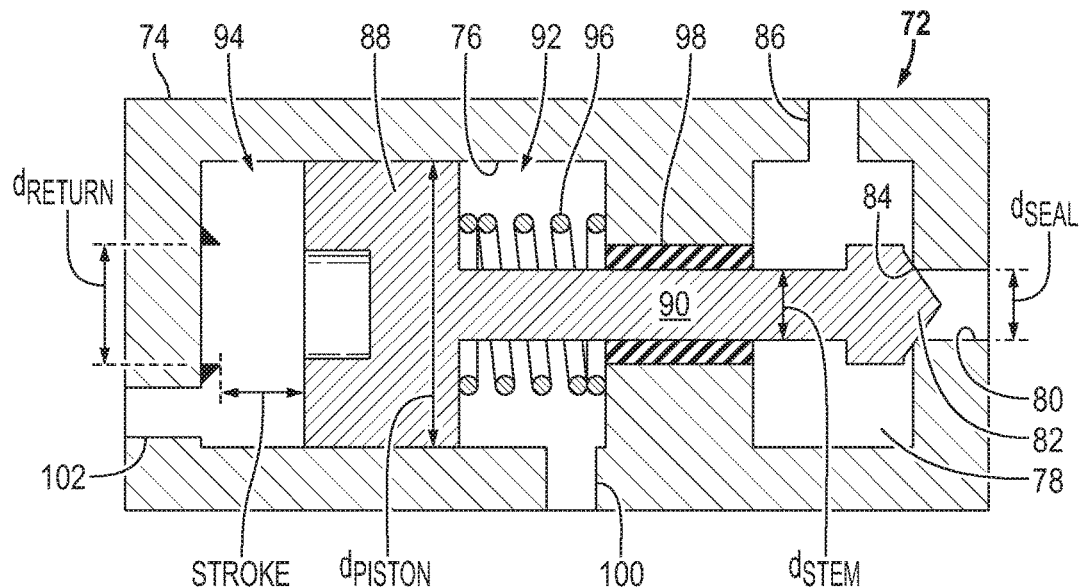
FIG. 2 is an illustration of a mechanical valve mechanism for use in a mechanical pressure regulation system for regulating barrier fluid in subsea fluid processing equipment, e.g. a subsea pumping system or compressor system, according to an embodiment of the disclosure.

Referring generally to FIG. 2, an example of the mechanical valve mechanism 72 is illustrated. In this embodiment, valve mechanism 72 is a pressure balanced supply valve for controlling the flow of barrier fluid 46 to components of subsea rotatable machine 36. By way of example, the valve mechanism 72 comprises a valve housing 74 having a pilot chamber 76, a high-pressure supply chamber 78, and a discharge chamber 80. The valve mechanism 72 may further comprise a valve end 82 sealably engageable with a valve seat 84 to form a seal separating high-pressure supply chamber 78 and discharge chamber 80 when valve mechanism 72 is in a closed position. Barrier fluid 46 may be introduced into high-pressure supply chamber 78 via a barrier fluid inlet 86 which receives barrier fluid from barrier fluid supply 62, e.g. umbilical 64.

In the example illustrated, the valve mechanism 72 further comprises a pilot piston 88 mechanically coupled with the valve end 82 via, for example, a valve stem 90 or other suitable structure. The pilot piston 88 is slidably positioned within pilot chamber 76, located within the valve housing 74, to separate a process fluid side 92 of the pilot chamber 76 from a barrier fluid side 94 of the pilot chamber 76.

The pilot piston 88 may be spring biased by a spring 96, e.g. a coil spring positioned around valve stem 90. In the example illustrated, the spring 96 is positioned between pilot piston 88 and a portion of the valve housing 74 on the process fluid side 92. Accordingly, the spring 96 biases the valve end 82 away from valve seat 84 to an open flow position between high-pressure supply chamber 78 and discharge chamber 80. Additionally, the spring 96 biases the pilot piston 88 toward the barrier fluid side 94 of the pilot chamber 76.

In the example illustrated, a seal 98, e.g. a stem seal, is positioned around valve stem 90 between pilot chamber 76 and high-pressure supply chamber 78 to prevent communication between the process fluid 42 and the barrier fluid 46 in the respective chambers. The process fluid side 92 of pilot chamber 76 may be placed in communication with process fluid 42 being pumped by rotating machine 36 via a process fluid port 100 located in valve housing 74. Additionally, a barrier fluid port 102 may be located in valve housing 74 to provide communication with the barrier fluid side 94 of pilot chamber 76.

In some embodiments, a return seal 104 is positioned in the barrier fluid side 94 of pilot chamber 76 to define the area of pilot piston 88 against which the barrier fluid 46 acts during operation of valve mechanism 72. Actuation of valve mechanism 72 may be controlled by pressure differentials between process fluid 42 and barrier fluid 46 according to various dimensions and characteristics of the valve mechanism 72. Examples of such dimensions and characteristics include the diameter of return seal 104, the stroke of pilot piston 88, the diameter of pilot piston 88, the diameter of valve stem 90, the diameter of the seal between valve end 82 and corresponding valve seat 84, and the configuration of nozzles 108, 114. These features may be arranged to provide a desired balancing of hydraulic forces acting on valve mechanism 72, e.g. on pilot piston 88, thus also enabling a desired hysteresis. For example, the arrangement and sizing of return seal 104 may be selected to enable a built-in hysteresis function as explained in greater detail below.

Figure 3:
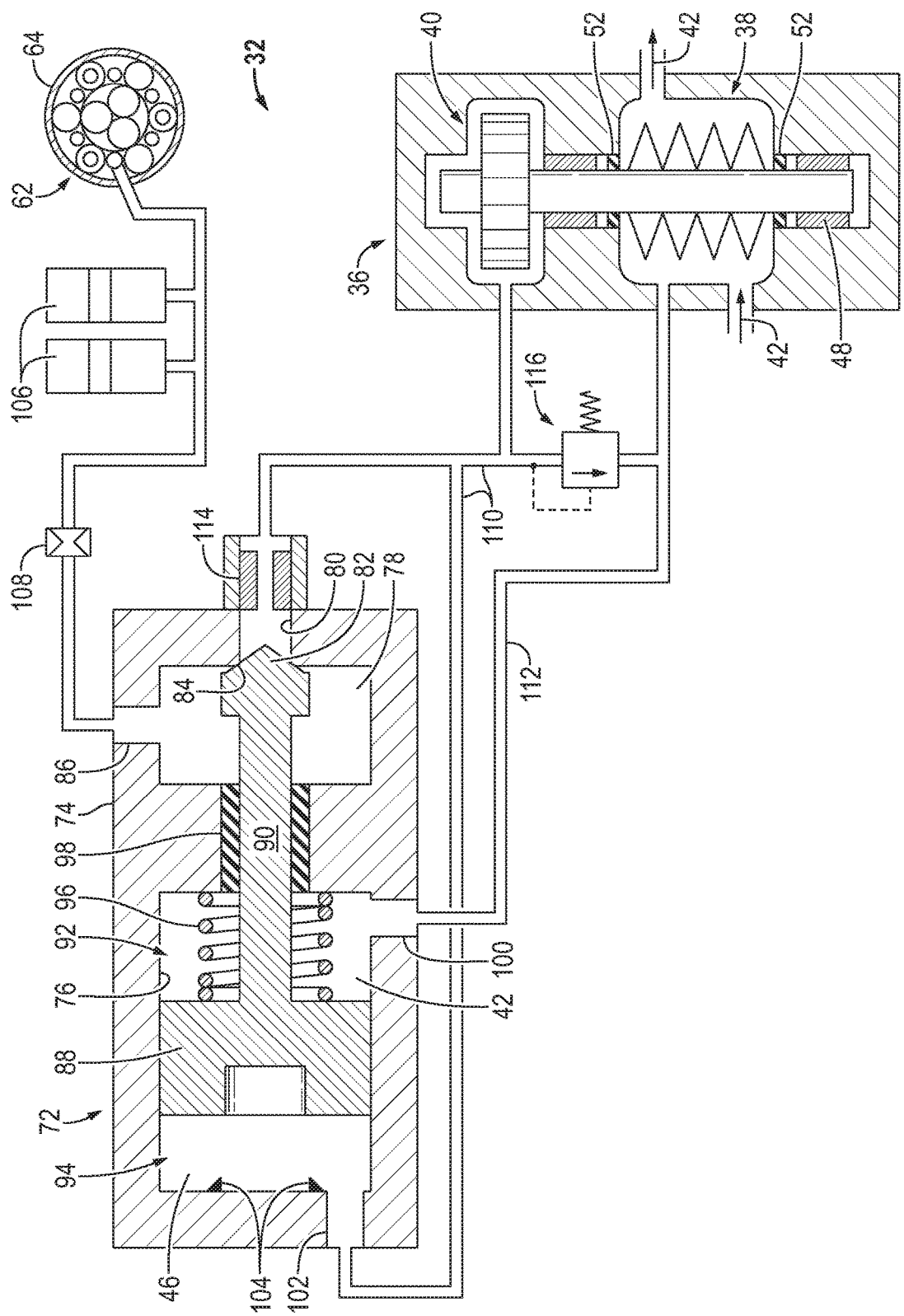
FIG. 3 is an illustration of an example of a mechanical valve system utilized in a mechanical pressure regulation system coupled with a subsea pumping system, according to an embodiment of the disclosure.

In FIG. 3, an embodiment of the valve mechanism 72 is illustrated as part of mechanical pressure regulation system 32. The valve mechanism 72/regulation system 32 are coupled with rotatable machine 36 and with barrier fluid supply 62, e.g. umbilical 64. In this example, barrier fluid 46 is supplied via umbilical 64 which may be used in combination with an accumulator 106, e.g. a plurality of accumulators 106. The accumulators 106 are in fluid communication with umbilical 64 and a supply nozzle 108. In this embodiment, barrier fluid 46 flows from umbilical 64, into accumulators 106, and through supply nozzle 108 before entering high-pressure supply chamber 78 via barrier fluid inlet 86.

Additionally, the valve mechanism 72 may be coupled with subsea rotatable machine 36 via a barrier fluid flow passage 110 and a process fluid flow passage 112. By way of example, the subsea rotatable machine 36 may be in the form of a subsea pumping system having subsea pump 38 powered by subsea motor 40. The process fluid 42 flowing through subsea pump 38 is in fluid communication with process fluid side 92 of pilot chamber 76 via process fluid flow passage 112 which is in fluid communication with process fluid port 100.

Additionally, barrier fluid components, e.g. subsea motor 40, thrust bearing 48, radial bearings 50, mechanical seals 52, flexible gear coupling 54, are placed in fluid communication with discharge chamber 80 and the barrier fluid side 94 of pilot chamber 76 via barrier fluid flow passage 110. It should be noted a portion of the barrier fluid flow passage 110 may be used to place discharge chamber 80 and the barrier fluid side 94 in fluid communication with each other. In some embodiments, a discharge nozzle 114 is positioned within discharge chamber 80 (or otherwise placed in fluid communication with discharge chamber 80) such that barrier fluid 46 flowing from high-pressure supply chamber 78 and out through discharge chamber 80 passes through the discharge nozzle 114. It should be noted discharge nozzle 114 (as well as other nozzles, e.g. supply nozzle 108) provide hysteresis effects. The configuration of the nozzles may be selected to achieve a desired hysteresis function. As illustrated, a bleed valve 116 may be coupled between barrier fluid flow passage 110 and process fluid flow passage 112.

Figure 4:
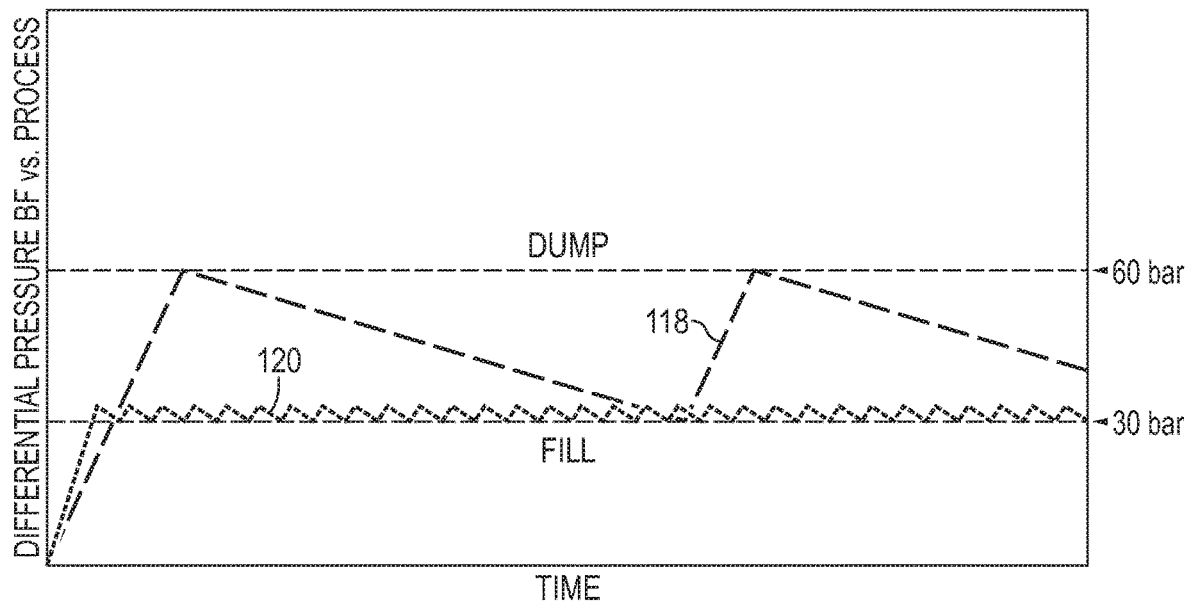
FIG. 4 is a graphical illustration showing aspects of a mechanical pressure regulation system for barrier fluid in subsea fluid processing equipment, according to an embodiment of the disclosure.

Referring generally to FIG. 4, a graphical example is provided to illustrate how the mechanical pressure regulation system 32 and its valve mechanism 72 operate to maintain a differential pressure between the barrier fluid 46 and the process fluid 42 within a desired range while providing a desired hysteresis effect. As illustrated by graph line 118, if the differential pressure is low, e.g. below a predetermined low of 30 bar or other suitable level, then the mechanical pressure regulation system 32 causes valve mechanism 72 to open. In the open position, valve mechanism 72 unseats valve end 82 from valve seat 84 and allows higher pressure barrier fluid 46 to flow from high-pressure supply chamber 78 into discharge chamber 80 and to fill rotatable machine 36. If the differential pressure is high, e.g. above a predetermined high of 60 bar or other suitable level, then the mechanical pressure regulation system 32 causes valve mechanism 72 to close. In the closed position, valve mechanism 72 seats valve end 82 against valve seat 84 and the higher pressure barrier fluid 46 is able to dump into the process fluid 42 via bleed valve 116.

As described in greater detail below, valve mechanism 72 is constructed to avoid behavior indicated by graph line 120 in which the valve opens when the differential pressure reaches the lower threshold but then quickly closes after filling for a short period. If the valve behaves in such a manner, a very large number of cycles results and the valve becomes prone to premature failure due to fatigue. In some embodiments, the valve mechanism 72 also is constructed to obtain a desired hysteresis as further indicated by graph line 118.

Referring generally to FIGS. 5-10, an operational example of the actuation of valve mechanism 72 is provided. In each of these Figures, an uppermost graph 122 is provided to indicate the position of valve 72, i.e. pilot piston 88 and valve end 82, via a dot 124. Additionally, a lower graph 126 is provided to indicate the differential pressure via a dot 128. The dots 124, 128 provide an indication where in the operation cycle the "snapshot" is taken with respect to the mechanical pressure regulation system 32 and valve mechanism 72.

It should be noted a differential pressure range having thresholds of 30 bars on the lower end and 60 bars on the upper end has been used in this example although other operations may utilize other predetermined differential pressure ranges. The differential pressure may result from differences in the barrier fluid pressure at valve mechanism 72 and the process fluid pressure at the suction and/or discharge end of a subsea pump (or at another suitable location). For purposes of explanation, the differential pressures may be considered as acting on opposite sides of pilot piston 88 at valve mechanism 72. Additionally, the supply pressure of barrier fluid 46, e.g. the pressure applied to barrier fluid 46 at the topside, is maintained substantially above the pressure of process fluid 42 at rotatable machine 36, e.g. 300 bars (or other suitable pressure) above the process pressure.

Figure 5:
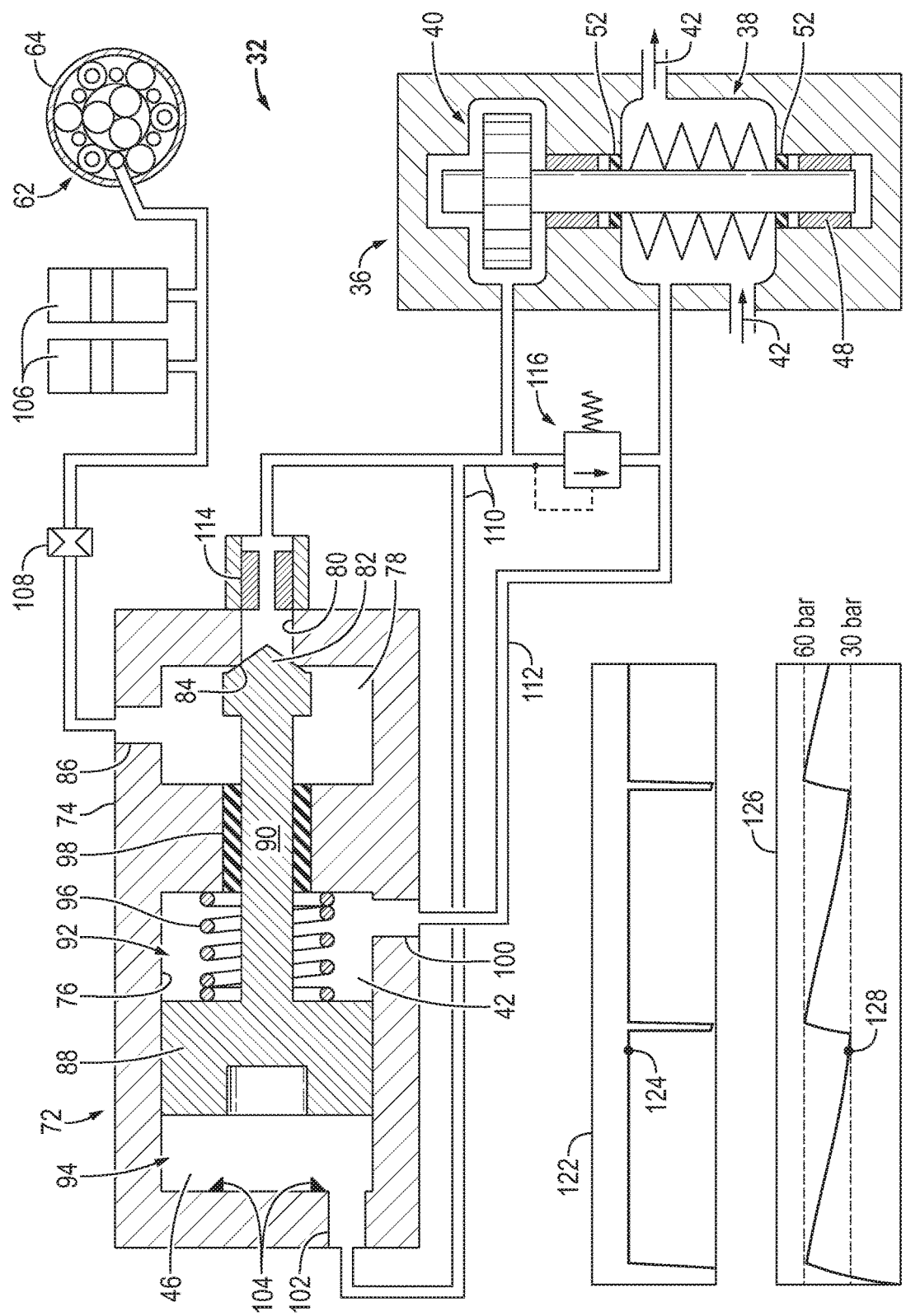
FIG. 5 is an illustration of an example of a mechanical valve system utilized in a mechanical pressure regulation system and positioned at an actuation position corresponding with a given differential pressure between barrier fluid and process fluid, according to an embodiment of the disclosure.
Figure 6:
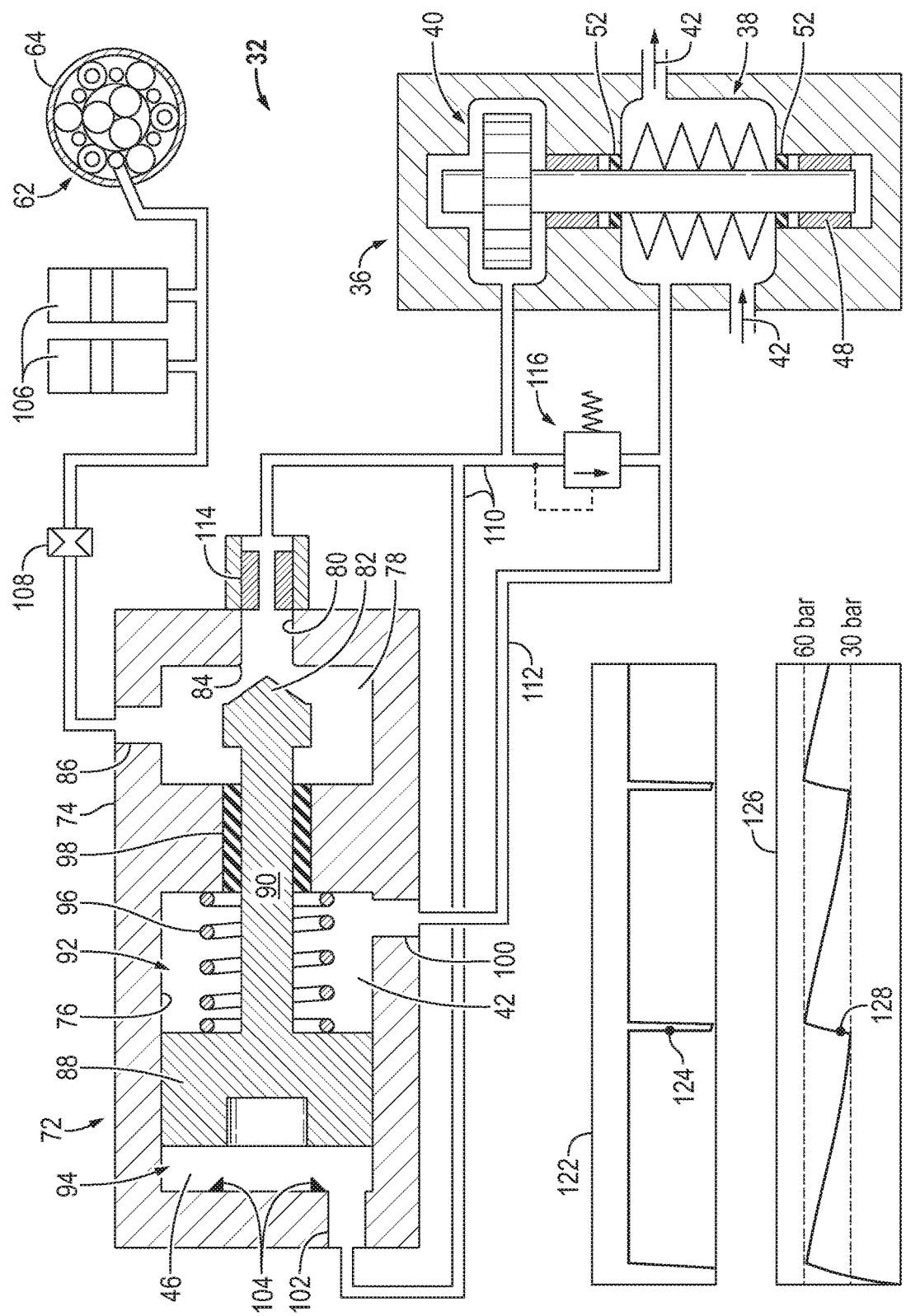
FIG. 6 is an illustration of an example of a mechanical valve system utilized in a mechanical pressure regulation system and positioned at an actuation position corresponding with a given differential pressure between barrier fluid and process fluid, according to an embodiment of the disclosure.

Referring initially to FIG. 5, the mechanical pressure regulation system 32 is illustrated in an operational position when the differential pressure between the barrier fluid 46 and the process fluid 42 at valve mechanism 72 is above 30 bars and the valve mechanism 72 is closed. When the differential pressure dips below the threshold of 30 bars, the force exerted by spring 96 is large enough to push pilot piston 88 to the left and the valve starts to open as valve end 82 is moved away from valve seat 84, as illustrated in FIG. 6.

Figure 7:
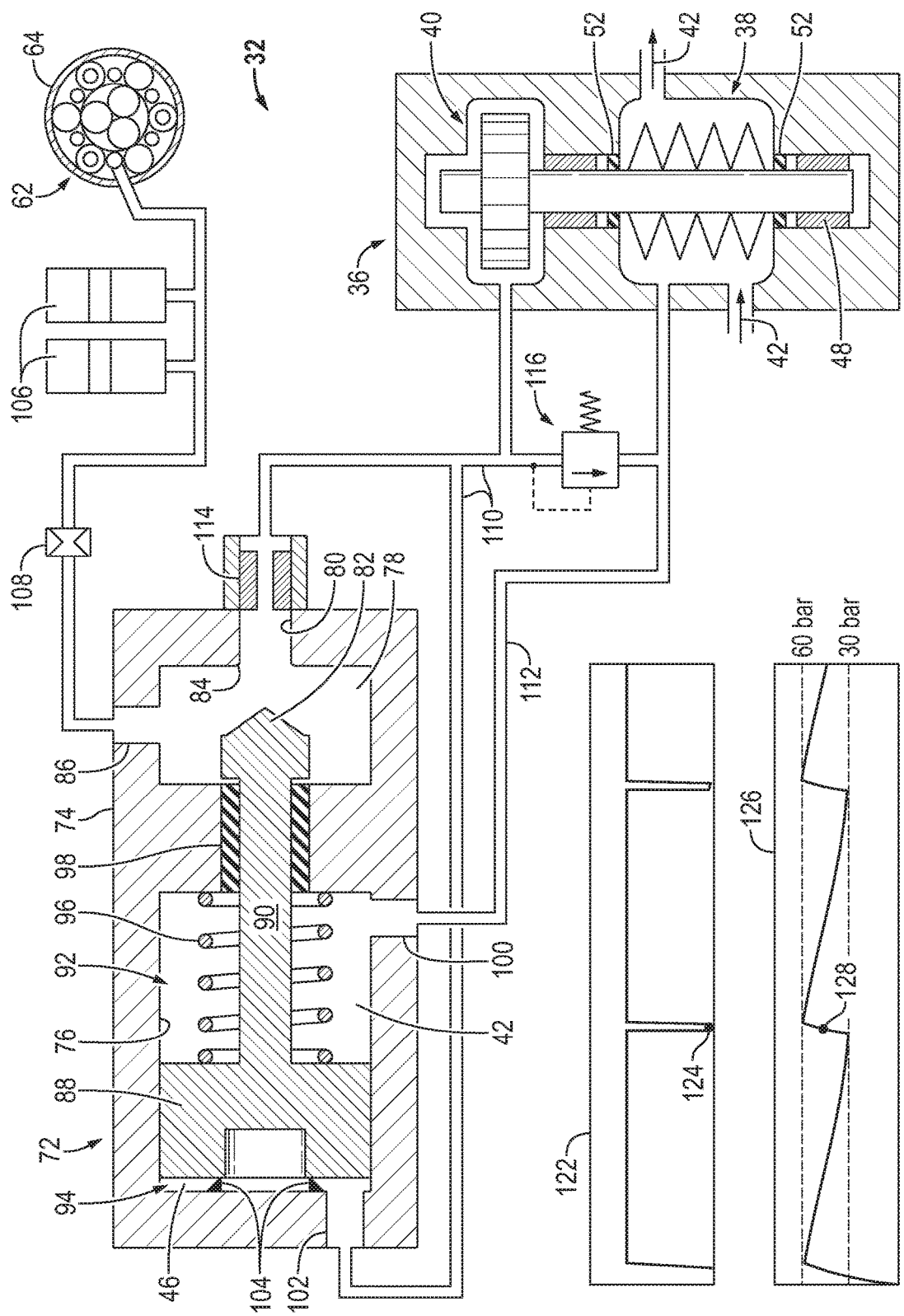
FIG. 7 is an illustration of an example of a mechanical valve system utilized in a mechanical pressure regulation system and positioned at an actuation position corresponding with a given differential pressure between barrier fluid and process fluid, according to an embodiment of the disclosure.

When the valve mechanism 72 is cracked open, the pressure upstream of the discharge nozzle 114 increases rapidly. This increase contributes additional opening force and accelerates the sliding of pilot piston 88 in the opening direction (moving the pilot piston 88 to the left in FIG. 6). In FIG. 7, the mechanical pressure regulation system 32 is illustrated in an operational position where the valve mechanism 72 has reached the fully open position and the pilot piston 88 is resting against return seal 104, e.g. a ring-shaped seal.

The return seal 104 isolates the pressure in the center area of the pilot piston 88. This pressure isolation function effectively creates a delay in the closing forces that appear when the pressure of barrier fluid 46 is rapidly increasing in the pump 38. In other words, the return seal 104 and the consequent pressure isolation effectively create a desired hysteresis in actuation of the valve mechanism 72, e.g. a slowing of the actuation rate.

Figure 8:
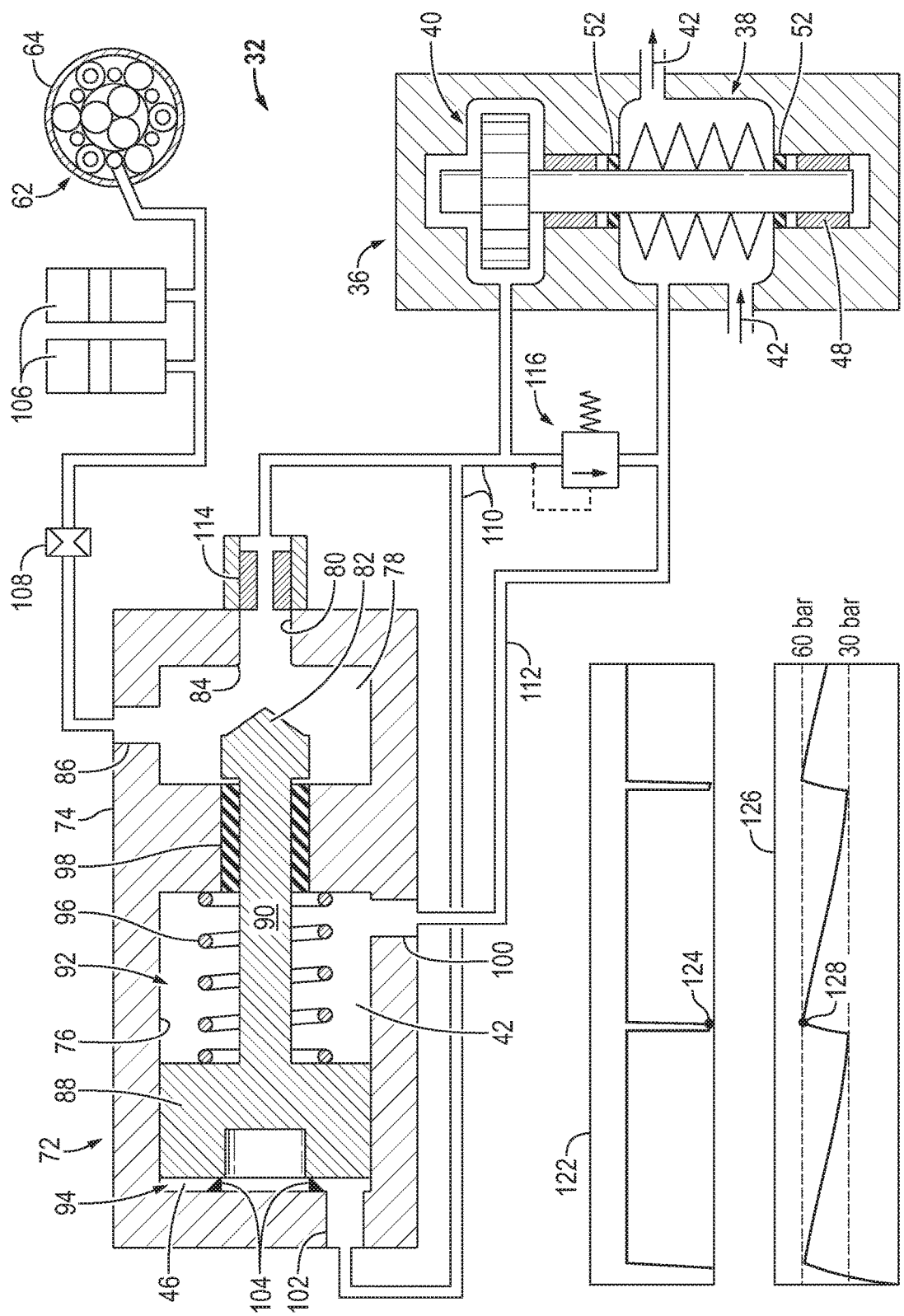
FIG. 8 is an illustration of an example of a mechanical valve system utilized in a mechanical pressure regulation system and positioned at an actuation position corresponding with a given differential pressure between barrier fluid and process fluid, according to an embodiment of the disclosure.

Referring generally to FIG. 8, the mechanical pressure regulation system 32 is illustrated when the differential pressure across pilot piston 88 reaches the upper threshold of 60 bars. In this condition, the force generated by the barrier fluid pressure acting against the pilot piston 88 on the barrier fluid side 94 becomes larger than the forces acting against the opposite side of the pilot piston 88 from the process fluid pressure on the process fluid side 92 combined with the force of spring 96. Consequently, the valve mechanism 72 begins to close.

Figure 9:
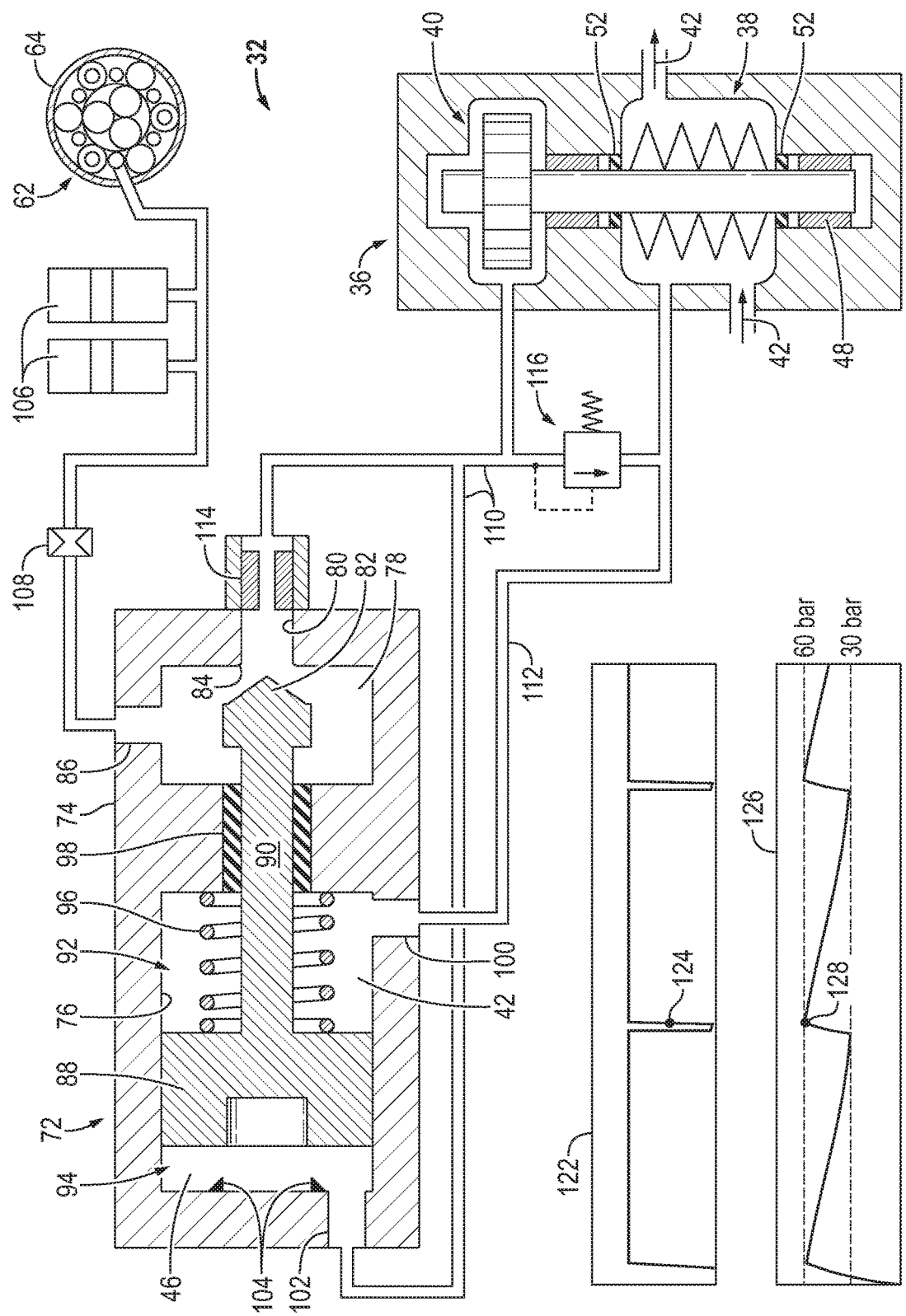
FIG. 9 is an illustration of an example of a mechanical valve system utilized in a mechanical pressure regulation system and positioned at an actuation position corresponding with a given differential pressure between barrier fluid and process fluid, according to an embodiment of the disclosure.
Figure 10:
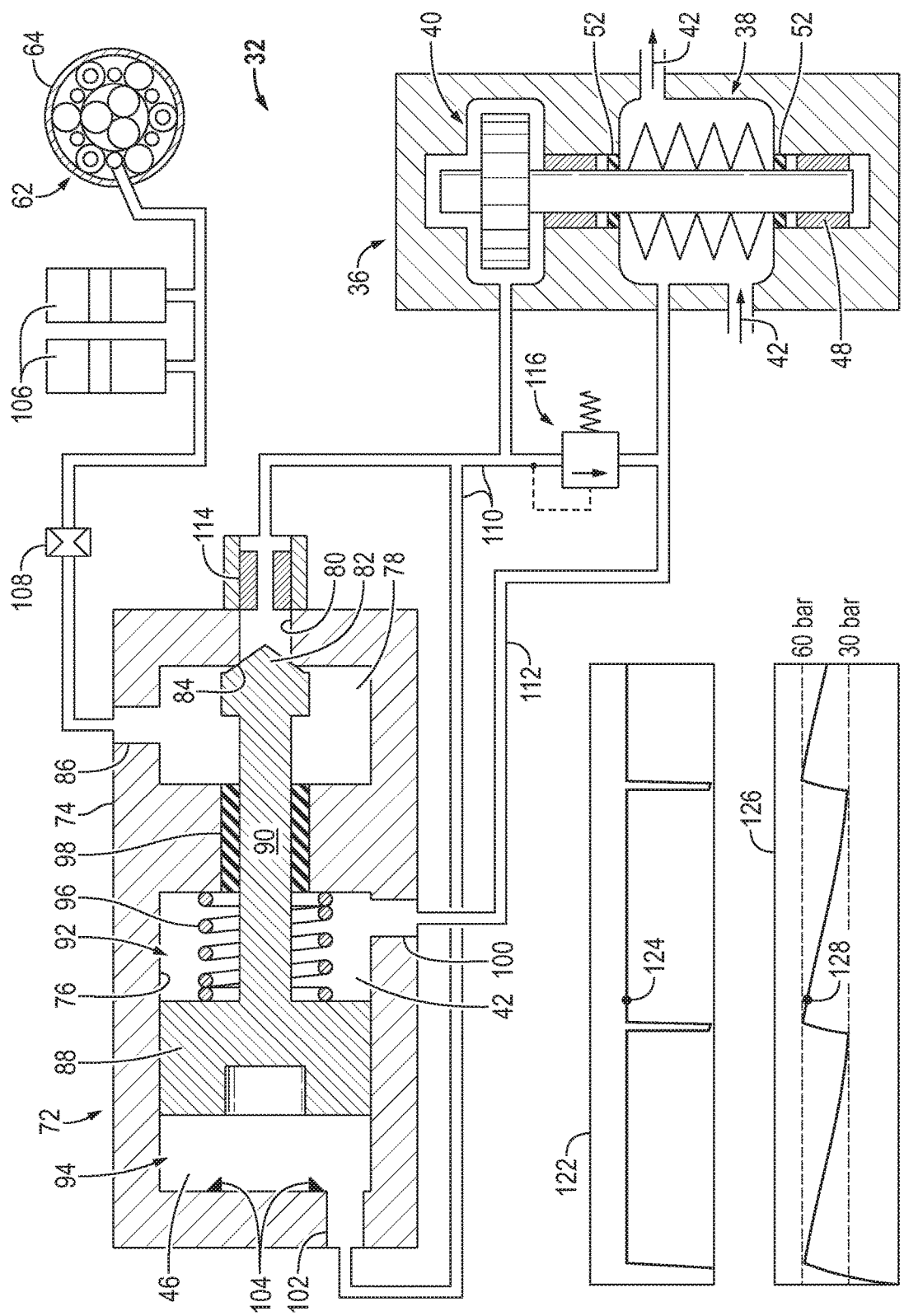
FIG. 10 is an illustration of an example of a mechanical valve system utilized in a mechanical pressure regulation system and positioned at an actuation position corresponding with a given differential pressure between barrier fluid and process fluid, according to an embodiment of the disclosure.

FIG. 9 depicts the state of the mechanical pressure regulation system 32 as the pilot piston 88 and valve end 82 move toward the valve closed position. Immediately when the pilot piston 88 is made free of the return seal 104, the entire corresponding piston surface of pilot piston 88 is exposed to the higher pressure of the barrier fluid 46 on barrier fluid side 94. This exposure accelerates the pilot piston 88 and the valve end 82 into the closed position, as illustrated in FIG. 10. The valve mechanism 72 will remain closed until the differential pressure again drops below the 30 bars threshold. In this manner, mechanical pressure regulation system 32 provides an automated mechanical control system which maintains the differential pressure between barrier fluid and process fluid within a predetermined range having an upper threshold and a lower threshold—while also providing a desired hysteresis with respect to valve actuation.

Figure 11:
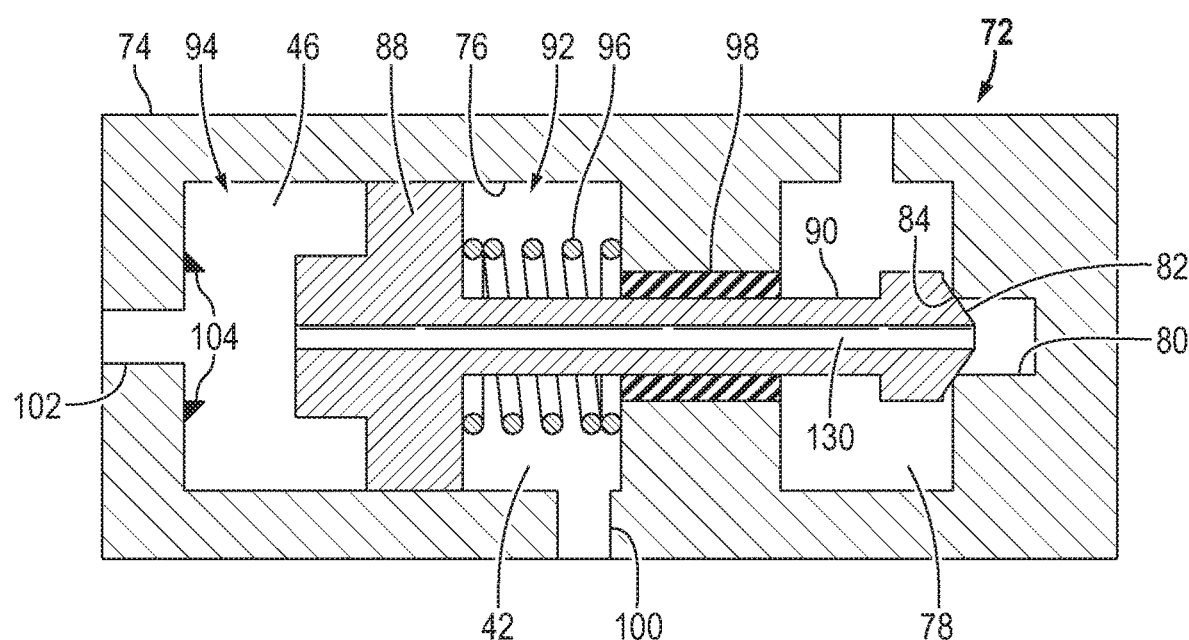
FIG. 11 is an illustration of another example of the mechanical valve system, according to an embodiment of the disclosure.

Referring generally to FIG. 11, another embodiment of valve mechanism 72 is illustrated. In this example, the valve mechanism 72 may once again be utilized as a mechanical supply valve which actuates automatically when used in a mechanical pressure regulation system for controlling barrier fluid in subsea fluid processing equipment. According to the embodiment illustrated in FIG. 11, a passageway 130, e.g. a central channel or bore, is formed through the pilot piston 88, stem 90, and valve end 82.

The passageway 130 allows fluid communication between an area within the return seal 104 and the discharge chamber 80 when the valve end 82 engages valve seat 84. Such a passageway 130 can be used to provide pressure balancing and/or to provide options in configuring a desired delay, e.g. a desired hysteresis, in valve actuation characteristics.

Figure 12:
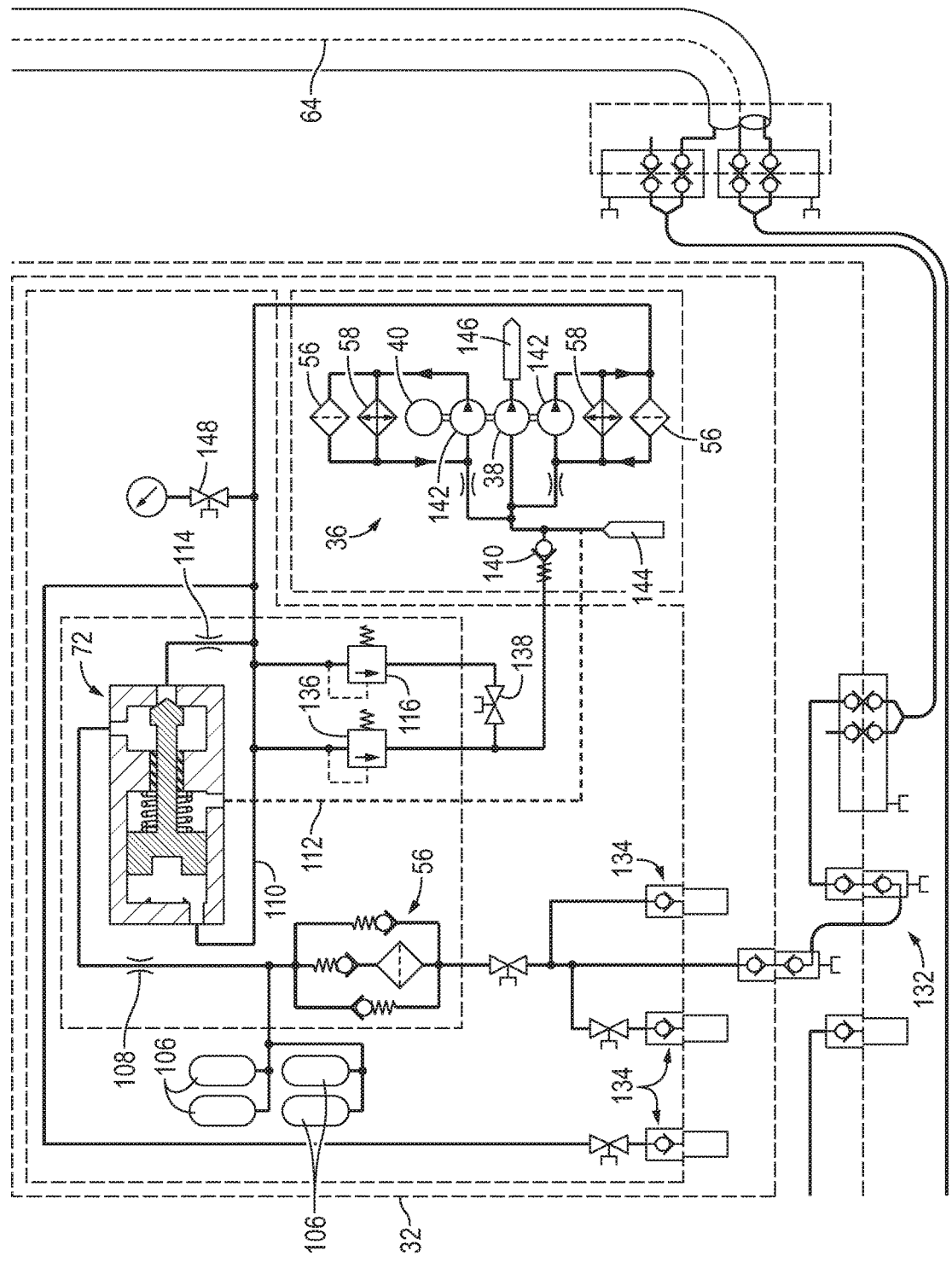
FIG. 12 is schematic illustration of an example of a mechanical valve system coupled into an example of a mechanical pressure regulation system, according to an embodiment of the disclosure.

Referring generally to FIG. 12, an example of one type of mechanical pressure regulation system 32 utilizing valve mechanism 72 is illustrated. It should be noted, however, the valve mechanism 72 may be used to enable automated mechanical valve actuation in many types of mechanical pressure regulation systems 32 having a variety of components. In the example illustrated, barrier fluid 46 is delivered to a subsea location via umbilical 64. The umbilical 64 may be placed in fluid communication with the mechanical pressure regulation system 32 via a variety of flow circuits 132.

In this example, the barrier fluid 46 is delivered through umbilical 64, through flow circuit 132, and into mechanical pressure regulation system 32 via suitable hydraulic connectors 134. The barrier fluid may be directed through an appropriate filter 56, accumulators 106, and supply nozzle 108 before flowing into high-pressure supply chamber 78 of valve mechanism 72.

As with other embodiments, the mechanical pressure regulation system 32 is placed in fluid communication with rotatable machine 36 via barrier fluid passage 110 and process fluid passage 112. The barrier fluid passage 110 and the process fluid passage 112 may be placed in fluid communication with each other across bleed valve 116, e.g. a dump valve, along with a backup bleed valve 136. Additionally, a suitable valve 138, e.g. a ball valve, and a check valve 140 may be located between the bleed valves 116, 136 as illustrated.

In the embodiment illustrated, the rotatable machine 36 again comprises pump (or compressor) 38 driven by motor 40. Various filters 56, coolers 58, and barrier fluid circulation impellers 142 may be used in combination with the pump/compressor 38 and motor 40. With respect to process fluid 42, the process fluid is drawn into the rotatable machine 36 via a process flow intake 144 (suction side) and discharged through a suitable discharge pipe 146 (discharge side). Pressures and other characteristics of the system may be monitored by suitable sensors 148, e.g. a manometer. It should be noted the mechanical pressure regulation system 32, rotatable machine 36, and other components and systems of the overall subsea system 30 may have many other and/or additional components and/or systems to accomplish a desired barrier fluid control in subsea operations.

As described above, the valve mechanism 72 provides a mechanical valve which actuates automatically to maintain a desired differential pressure between the barrier fluid 46 and the process fluid 42. The valve mechanism 72 also may be utilized to provide other desirable operational characteristics, such as a controlled hysteresis as described above. Furthermore, the valve mechanism 72 ensures that the barrier fluid pressure remains higher than the process fluid pressure for the subsea rotatable machine 36 even if the process pressure changes in a rapid manner. Additionally, the valve mechanism 72 provides a pressure balanced supply valve which balances forces acting on pilot piston 88 in a manner such that the upstream supply pressure can range from zero to a maximum design pressure and is relatively independent of the force used for opening the valve mechanism 72.

The valve mechanism 72 may be used in many types of systems, including systems which utilize a gooseneck that prevents a substantial portion of the process fluid from entering a metal bellows serving as a direct interface between the process fluid 42 and the barrier fluid 46. Such a metal bellows may be coupled into the system such that every time the barrier fluid 46 is being dumped there will be a barrier fluid leakage through a check valve in the metal bellows so as to flush out most of the process fluid from the metal bellows and out through the gooseneck. In such an application, the metal bellows does not see a differential pressure because there is a check valve in the upstream direction and the oil volume inside the bellows does not disappear.

Additionally, the mechanical pressure regulation system 32 enables the separation of dump valves and supply valves into different components, thus reducing component complexity. The mechanical pressure regulation system 32 also may be utilized as a pressure intensifier during pump intervention and as the process pressure is vented to the sea.

The design of the system also enables a robust supply of barrier fluid 46 without utilizing high levels of accumulator capacity, thus decreasing the volume of barrier fluid 46, e.g. barrier oil, in the overall system. The simple construction of mechanical pressure regulation system 32 and its use of valve mechanism 72 is adaptable to many types of subsea systems and applications, including subsea systems subject to fast transient conditions.

Although a few embodiments of the system and methodology have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A subsea fluid processing system, comprising:
a rotatable machine configured for subsea deployment where a process fluid is processed, the rotatable machine including one or more mechanical seals to separate a barrier fluid and the process fluid;
a barrier fluid supply source configured to be located at a surface location; and
a mechanical barrier fluid pressure regulation system configured to maintain a pressure differential between the barrier fluid and the process fluid between a predetermined upper limit and a predetermined lower limit, the pressure regulation system comprising:
a valve mechanism configured to provide the barrier fluid to the rotatable machine when the pressure differential reaches the predetermined lower limit and to dump the barrier fluid when the pressure differential reaches the predetermined upper limit, wherein the valve mechanism comprises:
a pressure balanced supply valve with a valve housing;
a pilot piston mechanically coupled to the supply valve and slidably positioned within a pilot chamber within the valve housing to separate a process fluid side of the pilot chamber from a barrier fluid side of the pilot chamber; and
a return seal disposed in the pilot chamber that isolates a pressure in a discharge chamber of the valve housing to delay the supply valve actuation when a pressure of the barrier fluid increases rapidly and to generate hysteresis in the opening and closing of the valve mechanism;
wherein the discharge chamber and the barrier fluid side of the pilot chamber are in fluid communication with each other and a discharge nozzle is positioned within the discharge chamber such that the barrier fluid flowing through the discharge chamber passes through the discharge nozzle to generate the hysteresis.

2. The system as recited in claim 1, wherein the rotatable machine comprises a subsea pump.

3. The system as recited in claim 2, wherein the subsea pump is powered by a subsea motor.

4. The system as recited in claim 2, wherein the subsea pump comprises a pump impeller and the one or more mechanical seals comprises a plurality of seals positioned to maintain separation between the process fluid moved by the pump impeller and the barrier fluid.

5. The system as recited in claim 1, wherein the valve mechanism is configured to open the supply valve when a predetermined criteria is met regardless of a value of a supply pressure of the barrier fluid such that the valve mechanism is pressure independent to thus enhance utilization for different applications with different pressure inputs.

6. The system as recited in claim 5, wherein the predetermined criteria comprise predetermined pressures acting on the pilot piston.

7. The system as recited in claim 6, wherein the pilot piston is spring biased to an open flow position allowing the barrier fluid to flow from the barrier fluid supply source to the rotatable machine.

8. A method, comprising:
positioning a rotatable machine at a subsea location to enable processing of a process fluid;
supplying the rotatable machine with a barrier fluid through a mechanical pressure regulation system; and
using a valve mechanism of the mechanical pressure regulation system to automatically maintain a pressure differential between the barrier fluid and the process fluid within a desired range by providing the barrier fluid to the rotatable machine when the pressure differential reaches a lower limit and dumping the barrier fluid when the pressure differential reaches an upper limit, the valve mechanism comprising a valve housing and being mechanically actuated via pressures applied to a pilot piston;
wherein the pilot piston is slidably positioned within a pilot chamber of the valve housing to separate a process fluid side of the pilot chamber from a barrier fluid side of the pilot chamber and
wherein a pressure in a discharge chamber of the valve housing is isolated by a return seal disposed in the pilot chamber to delay the valve mechanism actuation when a pressure of the barrier fluid increases rapidly and to generate hysteresis in the opening and closing of the valve mechanism;
and wherein the discharge chamber and the barrier fluid side of the pilot chamber are in fluid communication with each other and a discharge nozzle is positioned within the discharge chamber such that the barrier fluid flowing through the discharge chamber passes through the discharge nozzle to generate the hysteresis.

9. The method as recited in claim 8, further comprising using the valve mechanism to balance hydraulic forces.

10. The method as recited in claim 9, further comprising using the hydraulic forces to generate the hysteresis in the opening and closing of the valve mechanism.

11. The method as recited in claim 10, wherein positioning the rotatable machine comprises positioning a subsea pumping system having an impeller for pumping the process fluid.

* * * * *